(12) United States Patent
Stuart et al.

(10) Patent No.: US 8,557,909 B2
(45) Date of Patent: Oct. 15, 2013

(54) COATING COMPOSITION EXHIBITING REDUCED BLOCK, RAPID DRY RATE AN RELATED METHODS

(75) Inventors: Jonathan T. Stuart, Lansdale, PA (US); Ariel Lender, Schwenksville, PA (US)

(73) Assignee: Henry Company LLC, El Segundo, CA (US)

( * ) Notice: Subject to any disclaimer, the term of this patent is extended or adjusted under 35 U.S.C. 154(b) by 0 days.

(21) Appl. No.: 12/844,865

(22) Filed: Jul. 28, 2010

(65) Prior Publication Data

US 2011/0048569 A1   Mar. 3, 2011

Related U.S. Application Data

(60) Provisional application No. 61/238,246, filed on Aug. 31, 2009.

(51) Int. Cl.
   *C08K 3/34*   (2006.01)
   *F16L 9/14*   (2006.01)

(52) U.S. Cl.
   USPC .......................................... 524/493; 138/145

(58) Field of Classification Search
   USPC ....................................................... 524/493
   See application file for complete search history.

(56) References Cited

U.S. PATENT DOCUMENTS

| | | | |
|---|---|---|---|
| 4,623,738 A | 11/1986 | Sugerman et al. | |
| 5,713,996 A * | 2/1998 | Morris et al. | 106/277 |
| 6,123,753 A | 9/2000 | Craig | |
| 2002/0151629 A1* | 10/2002 | Buffkin et al. | 524/284 |
| 2003/0095770 A1 | 5/2003 | Fewkes et al. | |
| 2004/0062873 A1 | 4/2004 | Jung et al. | |
| 2004/0109853 A1 | 6/2004 | McDaniel | |
| 2004/0116602 A1 | 6/2004 | Botros et al. | |
| 2009/0084512 A1 | 4/2009 | Moffett | |

* cited by examiner

*Primary Examiner* — Hui Chin
(74) *Attorney, Agent, or Firm* — Flaster/Greenberg P.C.

(57) ABSTRACT

An emulsion composition to coat a substrate that includes a barrier-forming material, water; an organometallic compound, and at least one thickener is described. The composition may further include a material such as talc. Articles, including ductile pipes, coated with this material are also described. A method of increasing the drying rate of a composition applied to a substrate to form a coating that includes application of the emulsion composition and drying the composition to form a coating layer. Also included are methods of forming a coating that exhibits a reduced incidence of blocking or pull-off, comprising applying the emulsion composition to a substrate and drying, whereby the coating layer formed exhibits a reduced incidence of blocking or pull off relative to conventional asphalt emulsion coatings.

15 Claims, No Drawings

COATING COMPOSITION EXHIBITING REDUCED BLOCK, RAPID DRY RATE AN RELATED METHODS

CROSS REFERENCE TO RELATED APPLICATION

This application claims the benefit under 35 U.S.C. 119(e) of U.S. Provisional Patent Application No. 61/238,246, filed Aug. 31, 2009, the contents of which are incorporated herein by reference.

BACKGROUND OF THE INVENTION

Ductile iron pipe is commonly used for water distribution including potable water and sewage transport. The predominate raw material of pipe substrate is ductile iron, a spheroidized graphite cast iron. Like most ferrous or ferrite materials, ductile iron is susceptible to corrosion including galvanic, electrolytic corrosion, and/or microbiologically influenced corrosion. Thus, in the context of a ductile pipe application, it is advantageous to coat or line either the inner surface or outer surface or both of the pipe to mitigate corrosion concerns and extend life expectancy of the iron pipe insitu.

Prior art attempts at lining and/or coating the pipe include polyethylene sleeving by wrapping the pipe in a loose sleeve of polyethylene. Sleeving inhibits the corrosion by physically separating the pipe from soil particles, and preventing direct galvanic corrosion, and provides a barrier that is impermeable to ground water and inhibits the diffusion of oxygen to the ductile iron surface, thereby limiting the availability of electrolytes that would accelerate corrosion. However, use of polyethylene sleeves or encasements has several drawbacks.

Encasings can detach from iron pipes or develop holes or tears. Use of polyethylene sleeving is limited to certain soils or conditions including low moisture conditions, low soil contaminates and low soil resistivity. In addition, polyethylene is vulnerable to degradation by ultraviolet light, so storage, transport and transfer of the pipes requires cost intensive covered trucks and storage facilities.

Other attempts have been made to line the pipes using adherent coating, such as zinc, tar epoxy, or asphalt emulsion coatings, bituminous or polymer finishing layer. A disadvantage of any of these coatings is the lengthy time to dry that the coatings require during the manufacturing process. Because these coating(s) generally take up to thirty to forty five minutes to dry, the coating often rubs off on the production lines and can wash off if exposed to high winds or precipitation. In addition, partially dry coatings often stick or adhere to other pipes in production or other substrates, causing the pulling off of the coating of the pipe's surface ("pull-off" or "blocking"). Consequently, the production lines must significantly slow down line speeds, because compromised coatings result in unacceptable pipe production, and production must be slowed to a pace to accommodate those disadvantages.

Thus, there exists a need in the art for a coating which can be applied to a substrate such as a ductile metal substrate, such as that used in iron pipe, which has an increased rate of drying, blocking or pull-off resistance, and is able to avoid being washed off when exposed to precipitation.

BRIEF SUMMARY OF THE INVENTION

An emulsion composition to coat a substrate that includes a barrier-forming material, water; an organometallic compound, and at least one thickener is described. The composition may further include a material such as talc. Articles, including ductile pipes, coated with this material are also described. A method of increasing the drying rate of a composition applied to a substrate to form a coating that includes application of the emulsion composition and drying the composition to form a coating layer. Also include are methods of forming a coating that exhibits a reduced incidence of blocking or pull-off, comprising applying the emulsion composition to a substrate and drying, whereby the coating layer formed exhibits a reduced incidence of blocking or pull off relative to conventional asphalt emulsion coatings.

DESCRIPTION OF THE INVENTION

The aforementioned drawbacks are addressed by the invention, which encompasses emulsion compositions, coating layers formed from the emulsion compositions, and substrates, particularly metal substrates, that are coated with the coating layer. Also included within the scope of the invention are methods of reducing the rate of drying of the composition and methods of forming a coating that exhibits increased adherence to the substrate and/or a reduced incidence of blocking or "pull-off" during production. Once dried and formed, the coating layer provides to the substrate corrosion resistance, protection from physical damage, and/or reduction or prevention of contact of the substrate with materials adjacent to the substrate, for example, to prevent potable water from coming in contact with a metal surface of a metal pipe, vessel, or conduit. In addition, the rapid drying rate and increased adherence of the coating layer to the substrate provides a lessened incidence of blocking or "pull-off" during production, when the coated substrate is, for example, ductile pipe.

The emulsion composition of the invention includes a barrier-forming material. Such material may be any known or developed in the art that can be emulsified and, when dried or cured, forms a barrier that is substantially impermeable to water and/or chemical liquids (aqueous or nonaqueous). In some instances it may be preferred that the barrier-forming material is a polymer, copolymer or polymer blend (hereinafter, referred to collectively as "polymer" or "polymers"). For example, it may be a thermosetting polymer or thermoplastic polymer, such as, for example, acrylic polymers, polyurethane polymers, and styrenated-acrylic polymers.

As another alternative, the barrier-forming material may be an asphalt material, added to the composition in the form of a water-asphalt emulsion or as neat asphalt. Any asphalt may be selected; it may be preferred that the asphalt has a low oil content. For example, the water-asphalt emulsion composition of the invention composition of the invention may include a de-asphaltized "DA" grade asphalt. As is understood in the art, DA grade asphalt originates from "straight-run" asphalt that is formed from the distillation bottoms in crude oil refining. The DA asphalt is produced by solvent extracting remaining oil from straight-run asphalt.

Depending on the processing method(s) chosen to produce the emulsion composition and/or to coat the substrate, the asphalt selected as the barrier-forming material may be of a penetration grade ("pen grade") at 25° C., when tested according to ASTM method D 5, of about 0.5 to about 30, alternatively about 1 to about 20, or about 3 to about 15 (all at 25° C.). Similarly, it may be desirable to that the selected asphalt has a softening point of about 62° C. to about 95° C.

A noted above, the composition is a water-containing emulsion and the asphalt may be added to the composition in the form of a water-asphalt emulsion. Regardless of whether water is delivered to the end product composition with the active (asphalt or other compositions) or as free water, it is desirable that the water content of the overall composition is sufficient to form an emulsion and to maintain all the components of the composition separated in the liquid state. Nonetheless, the proportion of water relative to the remaining components must not be so great as to substantially impede the film forming capabilities of the composition. Total water may be present in the composition, for example, in an amount of about 25 wt % to about 85 wt % or about 30 wt % to about 50 wt % of the composition.

The asphalt content may be varied in an inverse manner with respect to the water content along similar guideline, i.e., the asphalt content must not be so high that the composition cannot be emulsified, nor so low that it cannot provide a coatable film. As an example, the total asphalt in the composition may be an amount of about 75 wt % to about 15 wt % or about 70 to about 50 wt % of the composition.

The composition of the invention may further include an organometallic compound, such as an organo-titnate or an organo zirconate. In an embodiment, the organometallic compound includes dialkoxy acyl titanates, trialkoxy acyl titantaes, alkoxy triacyl titantes, $C_1$-$C_8$ tetraalkyl titanates, and neoalkoxy titanates. Other examples of suitable titanates are provided, for example, in U.S. Pat. Nos. 4,084,893; 4,122,062; the contents of each of which are incorporated herein by reference.

For example, the titanate compound(s) selected may include isopropyl, triisostearoyl titanate (KR TTS); isopropyl, triacryl titanate (KR39DS); isopropyl, tri(N ethylaminoethylamino) titanate (KR 44); isopropyl, 4-aminobenzenesulfonyl di(dodecylbenzenesulfonyl) titanate (KR26S); isopropyl, di(4-aminobenzoyl) isostearoyl titanate (KR 37BS); isopropyl, tri(dioctylphosphate) titanate (KR 12); isopropyl, tridodecylbenzenesulfonyl titanate (KR9S); isopropyl, tri(dioctylpyrophosphato) titanate (KR38S); isopropyl, tricumylphenyl titanate (KR34S); titanium, di(cumylphenylate)oxyacetate (KR 134S); titanium, di(dioctylpyrophosphate) oxyacetate (KR 138S); titanium, di(butyl, octyl pyrophosphate) di(dioctyl, hydrogen phoshite) oxyacetate (KR 158FS); di(dioctylphosphato)ethylene titanate (KR212); di(dioctylpyrophosphato)ethylene titanate (KR 238S); di(butyl, methyl pyrophosphato)ethylene titanate di(dioctyl, hydrogen phosphate) (KR 262ES); tetraisopropyl di(dioctylphosphito) titanate (KR 41B); tetra(2,2 diallyloxymethyl-1 butoxy)titanium di(di-tridecyl phosphite) (KR 55); methacrylic functional amine (KR 238M); KR 262+acrylic functional amine (KR262A); neoalkoxy, trineodecanoyl titanate (LICA 01); neoalkoxy, tri(dodecyl)benzenesulfonyl titanate (LICA 09); neoalkoxy, tri(dioctyl)phosphate titanate (LICA 12); neoalkoxy, tri(dioctyl)pyrophosphato titanate (LICA 38); neoalkoxy, tri(N-ethylenediamino) ethyl titanate (LICA 44); neoalkoxy, tri(m-amino)-phenyl titanate (LICA 97); isopropyl, triisostearoyl titanate (KR TTS); isopropyl, triacryl titanate (KR39DS); isopropyl, tri(N ethylaminoethylamino) titanate (KR 44); isopropyl, 4-aminobenzenesulfonyl di(dodecylbenzenesulfonyl) titanate (KR26S); isopropyl, di(4-aminobenzoyl) isostearoyl titanate (KR 37BS); isopropyl, tri(dioctylphosphate) titanate (KR 12); isopropyl, tridodecylbenzenesulfonyl titanate (KR9S); isopropyl, tri(dioctylpyrophosphato) titanate (KR38S); isopropyl, tricumylphenyl titanate (KR34S); titanium, di(cumylphenylate)oxyacetate (KR 134S); titanium, di(dioctylpyrophosphate) oxyacetate (KR 138S); titanium, di(butyl, octyl pyrophosphate) di(dioctyl, hydrogen phoshite) oxyacetate (KR 158FS); di(dioctylphosphato)ethylene titanate (KR212); di(dioctylpyrophosphato)ethylene titanate (KR 238S); di(butyl, methyl pyrophosphato)ethylene titanate di(dioctyl, hydrogen phosphate) (KR 262ES); tetraisopropyl di(dioctylphosphito) titanate (KR 41B); tetra(2,2 diallyloxymethyl-1 butoxy)titanium di(di-tridecyl phosphite) (KR 55); KR238S+methacrylic functional amine (KR 238M); KR 262+acrylic functional amine (KR262A); neoalkoxy, trineodecanoyl titanate (LICA 01); neoalkoxy, tri(dodecyl)benzenesulfonyl titanate (LICA 09); neoalkoxy, tri(dioctyl)phosphate titanate (LICA 12); neoalkoxy, tri(dioctyl) pyrophosphato titanate (LICA 38); neoalkoxy, tri(N-ethylenediamino) ethyl titanate (LICA 44); and neoalkoxy, tri(m-amino)-phenyl titanate (LICA 97).

In some embodiments, the weight ratio of the barrier-forming material to the oranometallic compound may be about 1:about 400 to about 1.5:about 400.

The emulsion may contain emulsifier or emulsifiers. Such emulsifier(s) may be chosen from suitable nonionic or anionic asphalt emulsifier. In some embodiments, anionic emulsifiers may be preferred. The amount of emulsifier may be varied depending on the process conditions and the characteristics of the specific emulsifier(s) selected. As a guideline, it may be preferred that the amount of total emulsifier(s) present in the composition is no greater than about 10 wt % of the total composition.

Suitable emulsifiers may include sodium pyrophosphate (tetrasodium pyrophosphate) and natural or synthetic organic emulsifiers such as tall oil resin, rosins, wood-derived resins, either chemically reacted or unreacted. Examples may include, for example, the wood resin sold as VINSOL®, derived from a pine wood resin material and UNITOL®, a tall oil resin having —COOH functionality.

In one embodiment, the composition may include a mixture of wood resin and tall oil resin in a weight ratio of wood resin to tall oil resin of about 14:1 to about 27.5:1. In those embodiments which include wood resins and/or tall oil emulsifiers it may be desirable to include a dilute aqueous hydroxide solution, such as an hydroxide of potassium, sodium, lithium, organic amines.

The hydroxide is preferably diluted to about 45% in water, and is used for reacting with the emulsifier(s) to form soaps. The amount of hydroxide is determined based on the amount of emulsifier(s) and is typically selected to be about 12.5 to about 17.5 wt % of the total amount of the emulsifier(s) (at 100% concentration). Preferably, the composition includes from about 0.1 to about 1.0 wt %, and more preferably from about 0.25 to about 0.35 wt % of dilute aqueous hydroxide solution, more preferably aqueous potassium hydroxide solution diluted to about 45%.

Talc (magnesium silicate) may be added to the composition. Any talc may be used, although talc of mesh values of about 200 to about 400 may be preferred. It is believed that the talc serves to capture, absorb or otherwise sequester a portion of the oil and aqueous fractions of the invention thereby contributing to the rapid drying rate and/or increased adherence of the coating. Therefore, any materials having similar functionality may also be used, such as, for example, precipitated silica, especially with high BET surface areas.

The coating composition may include at least one thickener. Any suitable mineral filler or colloidal mineral suspensoid (collectively referred to herein as "mineral filler") may be used. However, smectite clays (synthetic or natural), such as bentonite, laponite, saponite, nontronite, or montmorillonite may be preferred.

Often when a mineral filler is used it is preferable to add a pH modifier, such as oxalic acid, during processing. If used, the pH modifier may be present in a ratio of about 45:1 to about 50:1 mineral filler to pH modifier.

By way of example, the composition of the present invention may include a mineral filler/pH modifier thickening system in an amount of about 0 (if another thickener is substituted) to about 2.2 wt %. The mineral filler may be present in an amount of about 0.01 to about 2 wt %, more preferably about 0.45 to about 0.50 wt %, and the pH modifier is present in an amount of about 0.005 to about 0.2 wt % or about 0.009 to about 0.010 wt % of the composition.

The coating composition also may include a surfactant, for example, a defoaming agent. Any suitable surfactant or defoaming agent may be used. The defoaming agent may be an anionic agent, more preferably, an anionic silicone-based surfactant, such as an aqueous silicone emulsion. The surfactant may be present in the composition in an amount of about 0.09 to about 1.5 wt % or about 0.09 to about 0.11 wt % of the composition.

Other additives may be included if desired. Examples include pigments and colorants, opacifiers, scents, biocidal agents, texturizing agents, desiccants and stabilizers.

The coating composition may be prepared using any process. For example, one may first combine the water and asphalt (water-asphalt) emulsion (or use a commercial water-based asphalt emulsion), then combine the emulsion with the remaining components. Alternatively, the components may be combined simultaneously. Mixing may occur in a horizontal tank with agitation or in a vertical mixing tank. If a polymer is used or a barrier-forming agent, the same process may be employed.

The emulsion composition is prepared and applied to a substrate to form a coating layer. The substrate may be of any material to which one wishes to apply a coating. Illustration examples are metal substrate, partially metal, ductile metal, iron, steel, metal alloys (nickel, iron, chromium, etc), concrete, ceramic, plastic, or polymer. The substrate may be in any format, including vessels, pipes, slabs, boards, tiles, and may possess any geometry, e.g., arctuate, planar, corrugated planar, spherical, etc. The coating layer may be continuous or discontinuous. If the substrate takes the format of a pipe, either the interior surface of the pipe, the exterior surface of the pipe, or both, may be coated.

The composition is applied to the substrate and dried, thereby forming a coating layer. Application may be accomplished by any means in the art, for example, brushing, rolling or spraying.

The coating layers so formed are substantially dry within the lapse of about 60 to about 1800 seconds, or 90 to about 300 seconds, or 110 to about 150 seconds, after application to the substrate. Drying can be accelerated by adding moving air to the curing environment. Dry times of 60 to about 600 seconds, or 90 to about 300 seconds, or 110 to about 150 seconds have been achieved using a 12-in diameter household fan on hi speed positioned about 12-20-inches from the coated panel.

The relative humidity and temperature at which this drying process may vary. For example in may be desirable that the rapid rate of drying is accomplished at temperatures of about less than 0 C to about 37 C and/or relative humidities of about 5% to about 100% and about 10% to about 90%, and about 20% to about 80%.

The coating is "dry" when the a substrate plus coating achieves a substantially contacts weight that does not change over time (because any water or other solvent has left the coating). For example, a 10 mil wet application of the coating is applied to a steel panel and conditioned at 25 C and 50% relative humidity. The panel is then weighed immediately after application then again in 5-15 minute increments. Dry is determined when a substantially constant weight is achieved. This test condition is only one example as dry time may vary depending on application thickness, temperature and relative humidity. Additionally, the coating layer exhibits reduced incidence of blocking (or pull-off), increased drying rate, and resistance to wash off.

Non-limiting examples are provided below to aid in the description of the invention.

EXAMPLE 1

An asphalt emulsion composition is prepared by first heating DA grade asphalt to form an asphaltic phase in a heated mixing tank at a temperature of 182°. In a separate tank a water phase is prepared by combining water at a temperature of 60° C., pinewood resin soap (concentrated VINSOL® soap at 20% solids) heated to 71° C. potassium hydroxide solution (45%).

The asphaltic phase and water phase are simultaneously fed through a colloid mill. The milled components then pass through a heat exchanger to cool the mixture to a temperature of 60° C. The mixture passes to a holding tank under agitation and then passes to a secondary mixing tank where the remaining components listed below in Table 1 are added to the mixture in the amounts shown. The final mixture passes through a gear pump and is filtered through a 0.025 cm pore size. The composition is mixed throughout the process to avoid lumping of the composition.

TABLE I

| Component | % By weight of Total Composition |
|---|---|
| Water | Q.S. |
| Asphalt | 43 |
| Talc | 10 |
| Vinsol ® resin | 1.5 |
| Silicone surfactant | 1.0 |
| KOH (45% soln) | 0.5 |
| Bentonite | 0.4 |
| Tetrasodium pyrophosphate | 0.3 |
| Neoalkoxy titanate | 0.1 |
| Antifoaming agent | 0.03 |
| Oxalic acid | 0.01 |

EXAMPLE 2

An asphalt emulsion composition ("Inventive Composition") is prepared as in Example 1. An comparative emulsion composition is prepared as is shown in U.S. Pat. No. 5,713, 996, Example 1 ("Comparative Composition"). Ductile pipes of 1 foot in diameter and 6 feet in length are spray coated on the exterior surfaces and are dried in the outdoors at an air temperature of 5° C. and 90% relative humidity. The five (5) pipes coated with the Inventive Composition are substantially dry within three (3) minutes. In contrast, the five (5) pipes coated with the Comparative Composition are still wet after a lapse of fifteen (15) minutes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An emulsion composition to coat a substrate comprising:
   a. a barrier-forming material that is an asphalt,
   b. water,
   c. an organometallic compound, and
   d. at least one thickener,
wherein, upon application of the composition to a substrate a coating is formed and the coating is substantially dry within the lapse of about 60 to about 1800 seconds from initial application.

2. The composition according to claim 1 further comprising a material chosen from talc and precipitated silica.

3. The composition according to claim 1, wherein the asphalt has a pen grade of about 1 to about 70.

4. The composition according to claim 1, wherein the asphalt has a pen grade of about 10 to about 50.

5. The composition according to claim 1, wherein the organometallic compound is chosen from an organotitanate, a di-alkoxy acyl titanate, a tri-alkoxy acyl titanate, a alkoxy triacyl titanate, and an alkoxy titanate.

6. The composition according to claim 1, wherein the organometallic compound comprises neoalkoxy titanate.

7. The composition according to claim 1, wherein the thickener comprises a modifier chosen from a smectite clay (synthetic or natural), laponite, saponite, nontronite, and montmorillonite.

8. The composition according to claim 1, further comprising a surfactant.

9. The composition according to claim 1, wherein the surfactant comprises a defoaming agent.

10. The composition according to claim 1, further comprising at least one pH modifier.

11. The composition according to claim 1, wherein the barrier-forming material is present in the composition in an amount of about 25% to about 50% by weight of the total composition.

12. The composition according to claim 1, wherein the organometallic compound is present in the composition in an amount of about 0.05% to about 0.02% by weight of the total composition.

13. A coating layer that is formed by a process comprising providing the emulsion composition of claim 1 to a substrate and drying the composition.

14. A coated article comprising the coating layer of claim 13.

15. A coated pipe comprising a pipe having an interior surface and an exterior surface wherein at least one of the surfaces is coated with a coating that comprises the coating layer of claim 13.

* * * * *